US010173369B2

(12) United States Patent
Mileti (10) Patent No.: US 10,173,369 B2
(45) Date of Patent: Jan. 8, 2019

(54) MULTI-LAYER PRODUCT WITH SEALING AREAS OF VARYING TEMPERATURE

(71) Applicant: Robert J. Mileti, Torrington, CT (US)

(72) Inventor: Robert J. Mileti, Torrington, CT (US)

(73) Assignee: Trlby Innovative LLC, Torrington, CT (US)

(*) Notice: Subject to any disclaimer, the term of this patent is extended or adjusted under 35 U.S.C. 154(b) by 526 days.

(21) Appl. No.: 15/008,073

(22) Filed: Jan. 27, 2016

(65) Prior Publication Data

US 2016/0136878 A1 May 19, 2016

Related U.S. Application Data (62) Division of application No. 12/511,729, filed on Jul. 29, 2009.

(51) Int. Cl.
*B29C 65/00* (2006.01)
*B29C 65/02* (2006.01)
(Continued)

(52) U.S. Cl.
CPC .............. *B29C 65/02* (2013.01); *B29C 65/48* (2013.01); *B29C 65/4815* (2013.01);
(Continued)

(58) Field of Classification Search
CPC ......... B29C 65/00; B29C 65/40; B29C 65/48; B29C 65/48; B29C 65/481; B29C 65/4815; B29C 65/50; B29C 65/5021; B29C 65/5057; B29C 66/00; B29C 66/004; B29C 66/10; B29C 66/1122; B29C 66/30; B29C 66/3452; B29C 66/3472; B29C 66/40; B29C 66/43; B29C 66/438; B29C 66/70; B29C 66/723; B29C 66/73; B29C 66/73116; B29C 66/80; B29C 66/85; B29C 66/8511; B29C 66/90; B29C 66/91; B29C 66/91413; B31B 19/00

See application file for complete search history.

(56) References Cited

U.S. PATENT DOCUMENTS 4,147,827 A  4/1979 Breidt, Jr. et al.
4,904,093 A  2/1990 Woods et al.
(Continued)

FOREIGN PATENT DOCUMENTS

EP  0345774 A1  12/1989
EP  1033238 A1  9/2000
(Continued)

*Primary Examiner* — Jacob T Minskey
*Assistant Examiner* — Matthew Hoover
(74) *Attorney, Agent, or Firm* — St. Onge Steward Johnston & Reens, LLC (57) ABSTRACT

An article of manufacture that has at least three layers of heat sealable material. There is at least one first heat seal between at least two of the layers in a first area effected at a first temperature. There is also at least one second heat seal between at least two more layers, where at least one of these two layers is distinct from the at least two layers joined by the first heat seal, in a second area effected at a second temperature, where the second temperature is different than the first temperature, thereby allowing for heat sealing of discrete areas of the article in discrete steps.

20 Claims, 9 Drawing Sheets

(51) Int. Cl.
*B29C 65/50* (2006.01)
*B29C 65/48* (2006.01)
*B31B 19/00* (2006.01)
B29C 65/74 (2006.01)
B29L 31/00 (2006.01)

(52) U.S. Cl.
CPC ...... *B29C 65/5021* (2013.01); *B29C 65/5057* (2013.01); *B29C 66/004* (2013.01); *B29C 66/1122* (2013.01); *B29C 66/3452* (2013.01); *B29C 66/3472* (2013.01); *B29C 66/43* (2013.01); *B29C 66/438* (2013.01); *B29C 66/723* (2013.01); *B29C 66/73116* (2013.01); *B29C 66/8511* (2013.01); *B29C 66/91413* (2013.01); *B31B 19/00* (2013.01); B29C 65/74 (2013.01); B29C 66/71 (2013.01); B29C 66/919 (2013.01); B29C 2793/0045 (2013.01); B29L 2031/7128 (2013.01); B31B 2219/603 (2013.01); B31B 2237/10 (2013.01); B31B 2237/50 (2013.01); Y10T 156/10 (2015.01); Y10T 156/1057 (2015.01); Y10T 428/1334 (2015.01); Y10T 428/24628 (2015.01)

(56) References Cited

U.S. PATENT DOCUMENTS

| | | | |
|---|---|---|---|
| 5,484,375 | A | 1/1996 | Owensby et al. |
| 5,536,542 | A | 7/1996 | Gillespie et al. |
| 5,647,832 | A | 7/1997 | Nickell et al. |
| 5,649,767 | A * | 7/1997 | Nickell ............... B65D 88/1618 383/105 |
| 6,996,951 | B2 | 2/2006 | Smith et al. |
| 2003/0138347 | A1 * | 7/2003 | Lin ..................... A61L 2/208 422/28 |
| 2006/0083875 | A1 | 4/2006 | Weaver |
| 2006/0093765 | A1 * | 5/2006 | Mueller ................ B29C 65/76 428/35.2 |
| 2010/0028649 | A1 | 2/2010 | Trouilhet et al. |

FOREIGN PATENT DOCUMENTS

| | | |
|---|---|---|
| EP | 2151316 A1 | 2/2010 |
| GB | 2070514 A | 9/1981 |
| GB | 2455949 A | 7/2009 |
| JP | 2002154577 A | 5/2002 |
| JP | 2005144757 A | 6/2005 |

* cited by examiner

MULTI-LAYER PRODUCT WITH SEALING AREAS OF VARYING TEMPERATURE

FIELD OF THE INVENTION

The subject invention relates to products formed of multiple layers of heat sealable materials. More particularly, the subject invention relates to products formed of multiple layers of heat sealable materials that are sealable at different temperatures in discrete areas of the product.

BACKGROUND OF THE INVENTION

There are numerous products formed using heat sealable materials, including pouches and other containers. They are manufactured by heat sealing together different layers of the materials in multiple locations to achieve the various sizes and shapes desired. U.S. Pat. Nos. 5,536,542 and 5,484,375 generally disclose articles created by heat sealing polymeric layers together.

It is often desirable to heat seal a multi-layer product in an area at a given temperature while not affecting one or more of the layers for design or functional reasons. Currently, this is achieved by introducing barrier layers such as paper, treating the layer that is to be protected with a lubricant or paint, or using a mechanical process to prevent a heat seal from occurring between certain layers in that area. This inevitably leads to additional multi-step processes which add time and cost to the manufacturing process. It would be advantageous to effect heat seals between layers in some areas at one temperature and in other areas at a different temperature without the need for additional intermediary steps.

U.S. Pat. No. 6,996,951 discloses a flexible multi-compartment container with peelable seals and a method for making such a container. In one specific embodiment, the container includes multiple layers, with an outer layer having a higher melting temperature than an inner seal layer. U.S. Pat. No. 4,147,827 discloses a method for the production of heat sealable co-extruded films having a high melting point core layer coated on at least one side with a lower melting point skin layer.

Thus, while the above references describe articles created by sealing together multiple layers of material, some of which may have different melting temperatures, none of them discloses, teaches or suggests a product formed of multiple layers that are heat sealed together wherein, in some areas, the materials forming the product are heat sealable at a lower temperature, and in other areas, the materials forming the product are heat sealable at a higher temperature, thereby allowing for heat sealing of discrete areas of the product in discrete steps.

SUMMARY OF THE INVENTION

It is therefore an object of the present invention to provide an improved process for producing articles formed of multiple layers of heat sealable material, which accommodates the heat sealing of discrete areas of the product in discrete steps.

It is a further object of the present invention to provide such an improved process which eliminates the need for intermediary steps within the process to impede heat sealing between layers in certain areas, where heat seals are not desired, to make the process more efficient and cost effective.

The subject invention results from the realization, in part, that a more time and cost effective process for producing articles formed of multiple layers of heat sealable material can be achieved by providing a process wherein certain layers of the product are heat sealable at a lower temperature, and in other areas, certain layers of the product are heat sealable at a higher temperature.

The subject invention, however, in other embodiments, need not achieve all these objectives and the claims hereof should not be limited to structures or methods capable of achieving these objectives.

The subject invention features an article of manufacture comprising at least three layers of heat sealable material. There is at least one first heat seal between at least two of the layers in a first area and effected at a first temperature. Also, there is least one second heat seal between at least two of the layers, wherein at least one these two layers is distinct from the two layers joined by the first heat seal. This second heat seal is in a second area and is effected at a second temperature that is different than the first temperature, thereby allowing for heat sealing of discrete areas of the article in discrete steps.

In one example, the at least three layers of heat sealable material comprise at least one laminate sheet. This sheet comprises a first face of material which is sealable at the first temperature and a second face of material that is sealable at the second temperature.

In another example, the article of manufacture is a flexible ported pouch. Here, the least three layers of heat sealable material comprise two pouch layers with the first heat seal therebetween and two port layers with the second heat seal therebetween.

In still another example, the article of manufacture is a dual layer baffle system. In this embodiment, the at least three layers of heat sealable material comprise two exterior layers connected to a plurality of baffles by a plurality of first heat seals, and a plurality of two baffle layers with the second heat seal there between.

The subject invention also features a method for forming an article of manufacture. The method comprises the steps of providing at least three layers of heat sealable material. At least one layer of the at least three layers and at least one opposing layer of the at least three layers are heated to a first temperature in a first area to effect at least one first heat seal. Then, at least one layer of the at least three layers and at least one opposing layer of the at least three layers are heated to a second temperature, wherein the second temperature is different from the first temperature. This forms at least one second heat seal in a second area, thereby allowing for heat sealing of discrete areas of the article in discrete steps.

In one example of this process, the at least three layers of heat sealable material comprise at least one laminate sheet. This sheet comprises a first face of material sealable at the first temperature and a second face of material sealable at the second temperature.

The subject invention also features a flexible ported pouch with an interior. In an exemplary embodiment, the pouch comprises a first pouch sheet and a second pouch sheet and is formed by a first heat seal at a first temperature around a periphery of the first and second pouch sheets. This first heat seal has at least one gap having an opening spaced from the first heat seal to provide a channel between the first pouch sheet and the second pouch sheet. There is a port that is interposed between the first pouch sheet and the second pouch sheet, and is in communication with the interior of the pouch. This port comprises a first port sheet and a second port sheet, and is formed by a second and third heat seal along the longitudinal edges of the first and second port sheets at a second temperature wherein the second temperature is higher than the first temperature. The first and second port sheets are further heat sealed to the pouch where the first and second port sheets intersect with the periphery of the first and second pouch sheets at the first temperature. The difference in sealing temperatures allows the port to be sealed to the pouch without the interior of port also being sealed.

Also, in the exemplary embodiment of the flexible ported pouch, the first and second port sheets are laminates comprising a first face sealable at the first temperature and a second face sealable at the second temperature. The first face forms the exterior of the port. The first face is sealable at a lower temperature so this allows the port to be sealed to the pouch at the point of intersection at the low temperature while leaving the interior of the port unsealed at this intersection.

In other aspects of the present invention, the flexible pouch configuration can also be achieved by substituting the first and second pouch sheets with a single pouch sheet, folding it over on an axis, and effecting the first heat seal at the first temperature around the open pouch edges that are formed. Similarly, the flexible port configuration can be achieved by substituting the first and second port sheets with a single port sheet folded about an axis and replacing the second and third heat seals with a single heat seal at the second temperature along the open longitudinal edge. The single sheet port configuration can also feature a single port sheet comprising a laminate. This laminate comprises a first face sealable at the first temperature and a second face sealable at the second temperature with the first face forming the exterior of the port.

The subject invention further features a method of manufacturing a flexible ported pouch. The method comprises the steps of providing a first and second port sheet of heat sealable material in parallel. The first and second port sheets are then heated along their longitudinal edges to a first temperature to effect a first and second heat seal to form a port with an exterior and an interior. First and second pouch sheets of heat sealable material are then provided in parallel. The port is introduced by interposition between the first and second pouch sheets. Finally, a periphery of the first pouch sheet, the second pouch sheet and the exterior of the port, where the exterior of the port intersects with the periphery of the first and second pouch sheets, is heated to a second temperature. The second temperature is lower than the first temperature and effects a third heat seal without sealing the interior of the port at the intersection of the periphery of the pouch.

The subject method can also be executed by substituting the first and second port sheets with a single port sheet and folding it upon an axis. The open longitudinal edge can then be heated to the first temperature to effect a first heat seal to replace the first and second heat seals of the exemplary method. Similarly, the first and second pouch sheets can be replaced by a single pouch sheet folded upon an axis and sealed along the open edges at the second temperature.

The subject invention also includes a dual layer film baffle system. The exemplary embodiment of the baffle system comprises a first and second sheet of heat sealable material. There is then a plurality of baffle elements interposed between the first and second sheets. These baffle elements comprise a third sheet of heat sealable material heat sealed at a first temperature along one edge of the third sheet and latitudinally across the first sheet. A fourth sheet of heat sealable material is heat sealed at the first temperature along one edge of the fourth sheet and latitudinally across the second sheet. The third and fourth sheets are further heat sealed together along their common edge at a second temperature wherein the second temperature is higher than the first temperature.

In the exemplary embodiment of the baffle system, the first and second sheets of heat sealable material are low temperature heat sealing material and the third and fourth sheets of heat sealable material are laminates comprising a first face of high temperature sealing material and a second face of low temperature sealing material.

The subject invention also features a method of manufacturing a dual layer baffle system. The method comprises the steps of providing a first and second sheet of heat sealable material in parallel. The sheets are then heated to a first temperature latitudinally across the first and second sheets at a longitudinal interval to effect a plurality of first heat seals. The first and second sheets are then perforated latitudinally across the sheets at the longitudinal interval effecting a plurality of perforated lines. A third sheet of heat sealable material is then introduced to the exterior of the first sheet. A fourth sheet of heat sealable material is then introduced to the exterior of the second sheet. Then, the third sheet, the first sheet, the fourth sheet and the second sheet are heated to a second temperature, wherein the second temperature is lower than the first temperature, latitudinally across the sheets at the longitudinal interval, effecting a plurality of second heat seals between the fourth sheet and the first sheet and a plurality of third heat seals between the third sheet and the second sheet. Finally, the fourth sheet and third sheet are spread apart, thereby separating the first and second sheet along the perforated lines to effect baffles between the fourth sheet and the third sheet.

BRIEF DESCRIPTION OF THE DRAWINGS

Other objects, features and advantages will occur to those skilled in the art from the following description of an exemplary embodiment and the accompanying drawings, in which:

FIG. 2 is

DETAILED DESCRIPTION OF THE INVENTION

Aside from the exemplary embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. Moreover, the claims hereof are not to be read restrictively unless there is clear and convincing evidence manifesting a certain exclusion, restriction, or disclaimer.

In general, the subject invention is heat sealing multiple layers of material at different temperatures at various locations. A sheet of material may be a laminate and have one face of material, or layer, with a heat sealing temperature that is higher than the heat sealing temperature of the opposite face of material, or layer.

Figure 1:
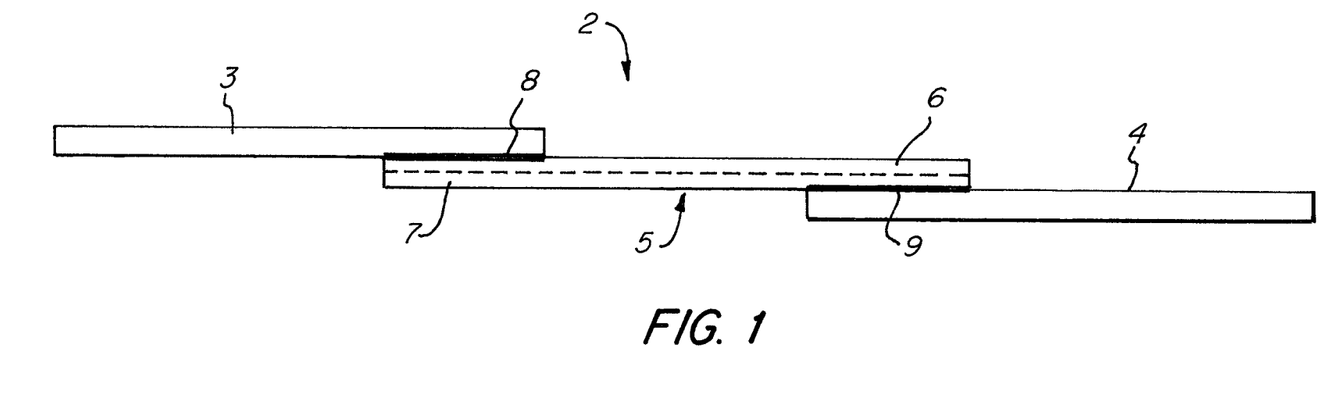
FIG. 1 shows a schematic cross sectional view of an article of manufacture consisting of multiple layers of heat sealable material and multiple heat seals.

One embodiment of the subject invention is article of manufacture 2, FIG. 1. Sheet 5 is laminate where layer 6 and layer 7 are heat sealable at different temperatures. Heat seal 8 is formed by heating layer 3 and sheet 5 to a first temperature at which a seal between layer 3 and layer 6 is effected. Heat seal 9 is formed by heating layer 4 and sheet 5 to a second temperature, which is different than the first temperature, and at which a seal between layer 4 and layer 7 is effected.

Figure 2:
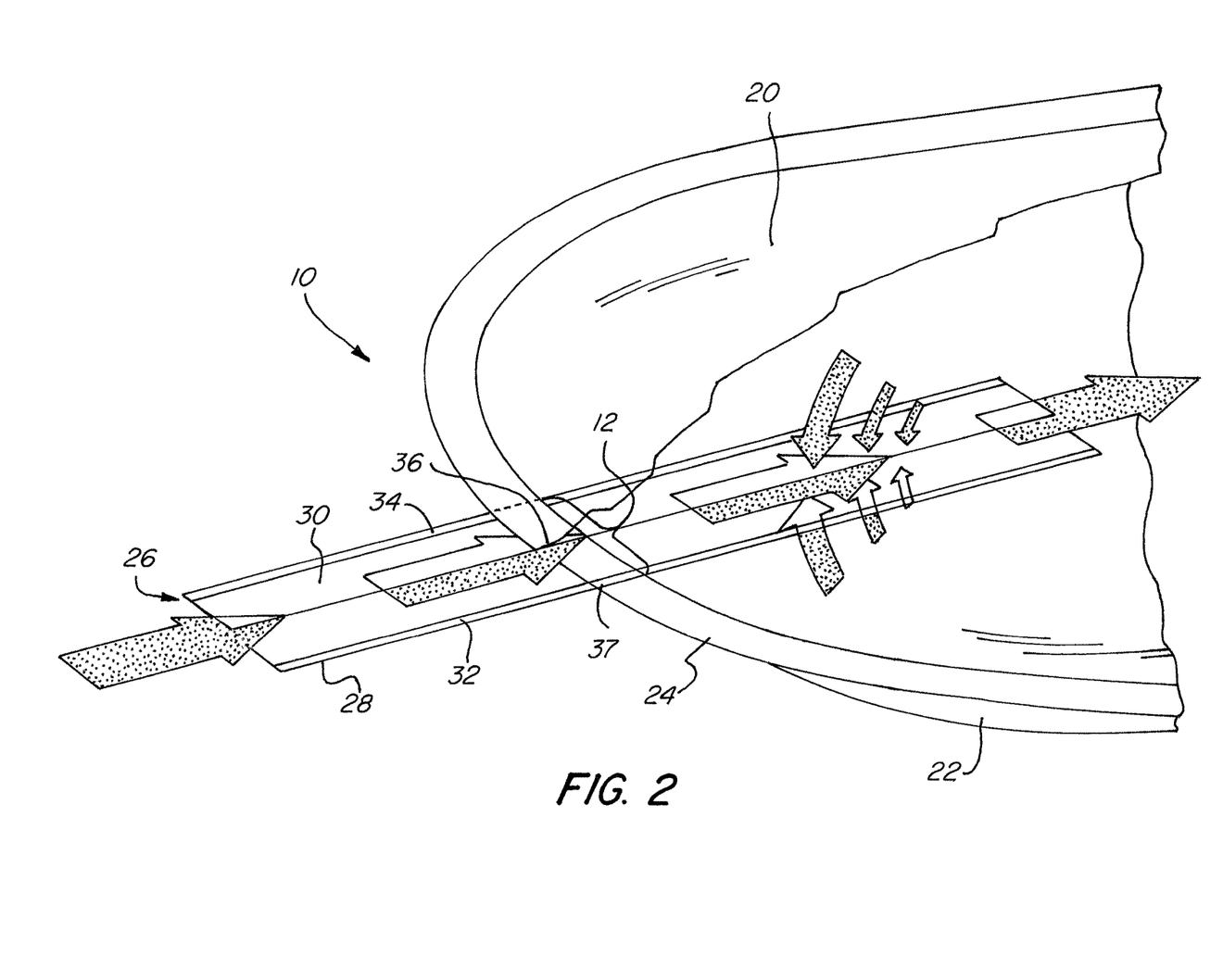
FIG. 2 shows a perspective view of a portion of an assembled flexible ported pouch employing the multiple layers and multiple heat seals shown in FIG. 1.

In one particular embodiment, flexible ported pouch 10, FIG. 2, has a top pouch sheet 20 and a bottom pouch sheet 22 each made of heat sealable material. In one exemplary embodiment, the material is Low Density Polyethylene (LDPE) and is heat sealable between 225-275 degrees F., but other heat sealing sheets or heat sealing laminates can be used. In some other embodiments, pouch sheets 20 and 22 may be a single heat sealable sheet or heat sealable laminate folded about an axis to create top sheet 20 and bottom pouch sheets 22.

Figure 4:
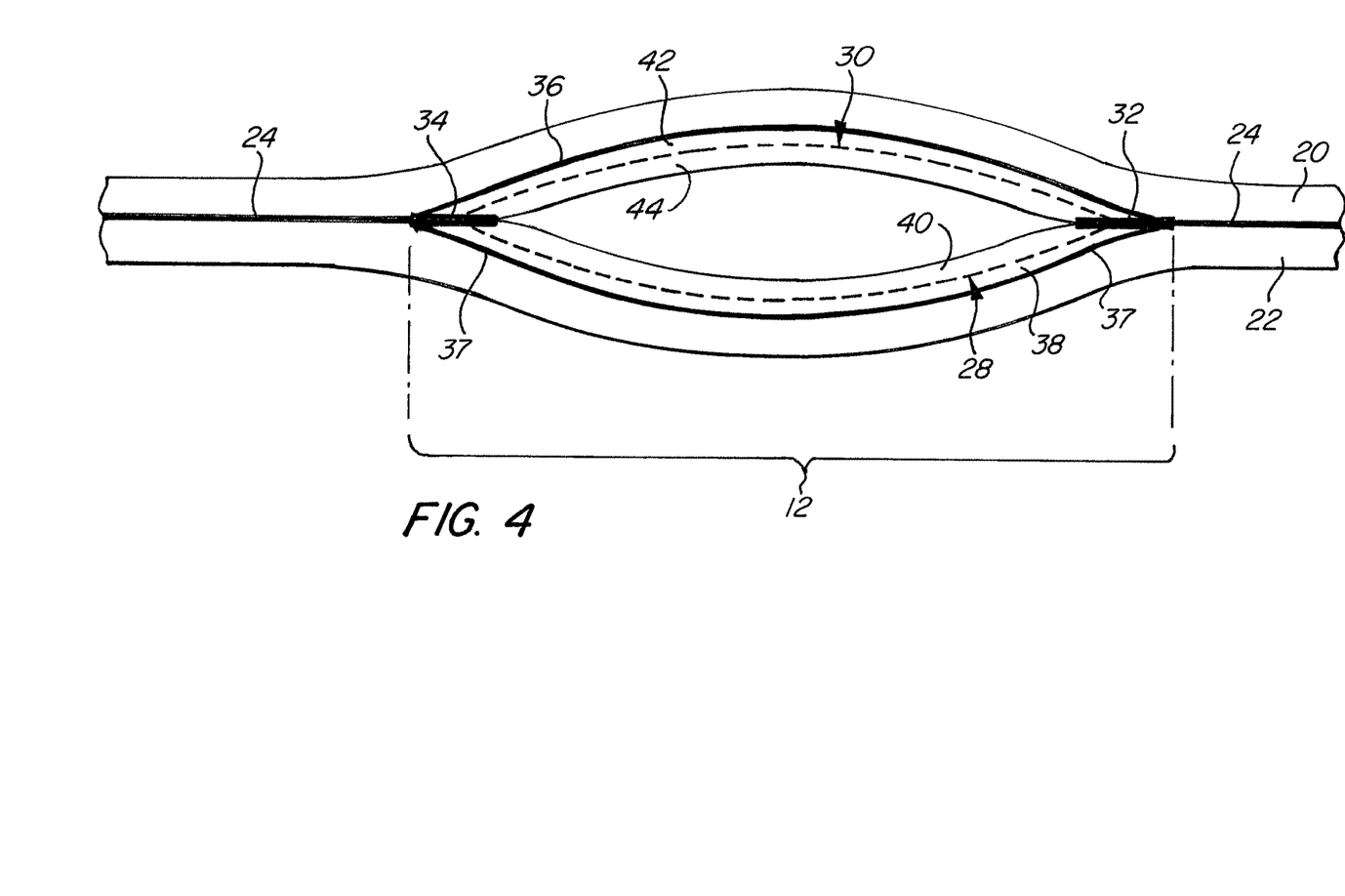
FIG. 4 shows a greatly enlarged schematic cross sectional view of the port opening of the exemplary embodiment of an assembled flexible ported pouch of FIG. 2 wherein the port sheets are laminates.

Port 26, also FIG. 2, has a top port sheet 30 and bottom port sheet 28 each made of heat sealable material. In the exemplary embodiment in FIG. 4, top port sheet 30 is a laminate having one layer 42 with a low sealing temperature and the opposite layer 44 having a high sealing temperature. Likewise, bottom port sheet 28 is a laminate having one layer 38 with a low sealing temperature and the opposite layer 40 having a high sealing temperature. In this exemplary embodiment, layers 38 and 42 which form the exterior face of port 26 are made of LDPE and are heat sealable between 225-275 degrees F. while layers 40 and 44 which form the interior of port 26 are made of High Density Polyethylene (HDPE) and are heat sealable between 325-375 degrees F. Other heat sealable sheets or heat sealable laminates may be used for port sheet 28 and port sheet 30 as long as the interior of port 26 is heat sealable at a temperature that is higher than the heat sealing temperature of pouch sheets 20 and 22. This prevents the sealing of the interior of port 26 where it intersects with pouch 10 at gap 12. Port sheet 28 and port sheet 30 may, in other embodiments, be a single heat sealable sheet or heat sealable laminate folded about an axis to create top port sheet 30 and bottom port sheet 28.

Figure 3:
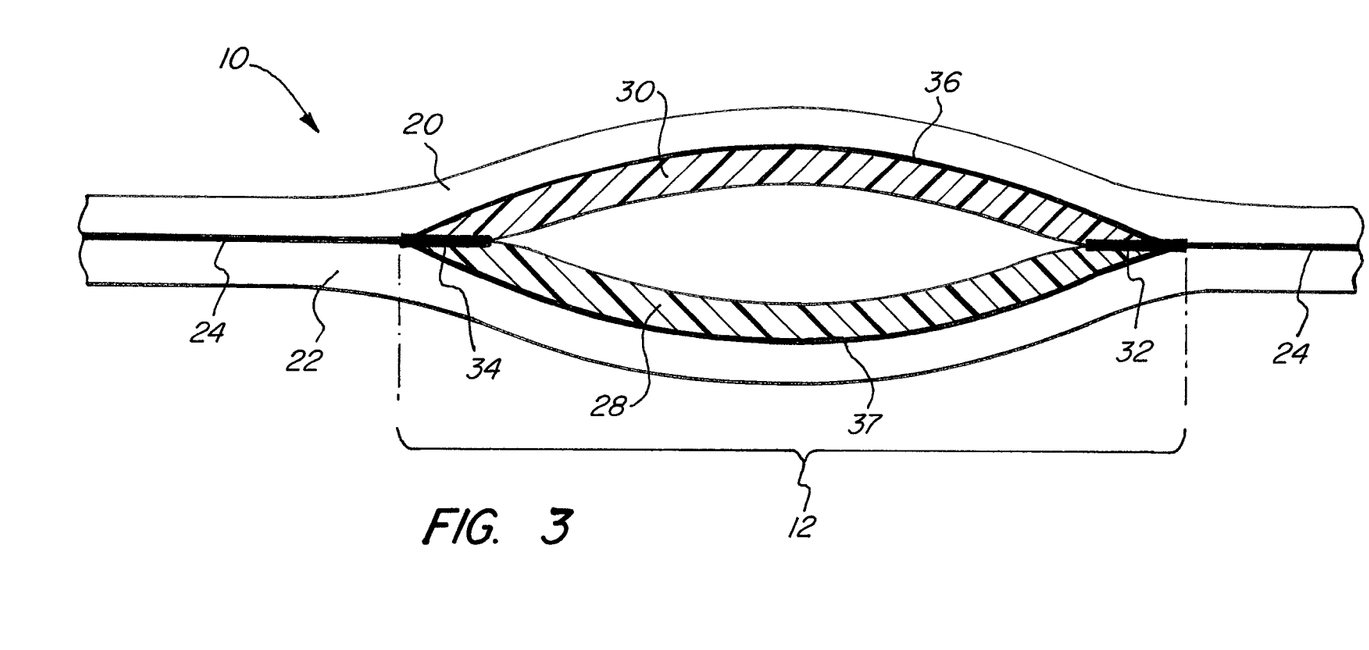
FIG. 3 shows a greatly enlarged schematic cross sectional view of the port opening of an assembled flexible ported pouch of FIG. 2.

In FIG. 2, port 26 is interposed between top pouch sheet 20 and bottom pouch sheet 22 at gap 12. FIG. 3 shows port edge heat seal 32 and port edge heat seal 34 between top port sheet 30 and bottom port sheet 28. In the exemplary embodiment in FIG. 4, layer 44 of top port sheet 30 and layer 40 of bottom port sheet 28 are heat sealed at port edge heat seals 32 and 34. Preferably, these heat seals are effected between a temperature of 325-375 degrees F. In other embodiments, if port 26 is formed using a single sheet or laminate folded about an axis, only one heat seal would need to be effected along the open edge of the folded sheet.

Top pouch sheet 20, FIG. 2, is heat sealed to bottom pouch sheet 22 along periphery heat seal 24 at a temperature which is lower than that of the temperature used to seal port 26 at port edge heat seals 32 and 34. In FIG. 3, where periphery heat seal 24 intersects with port 26 at gap 12, heat seal 36 is formed between top pouch sheet 20 and top port sheet 30 and heat seal 37 is formed between bottom pouch sheet 22 and bottom port sheet 28. In the exemplary embodiment in FIG. 4, where periphery heat seal 24 intersects with port 26 at gap 12, heat seal 36 is formed between top pouch sheet 20 and layer 42 of top port sheet 30 and heat seal 37 is formed between bottom pouch sheet 22 and layer 38 of bottom port sheet 28. It is preferable that heat seals 24, 36 and 37 are effected at a temperature between 225-275 degrees F. This seals the exterior of port 26 to pouch 10 at gap 12 without sealing the interior of port 26 along gap 12.

Figure 5:
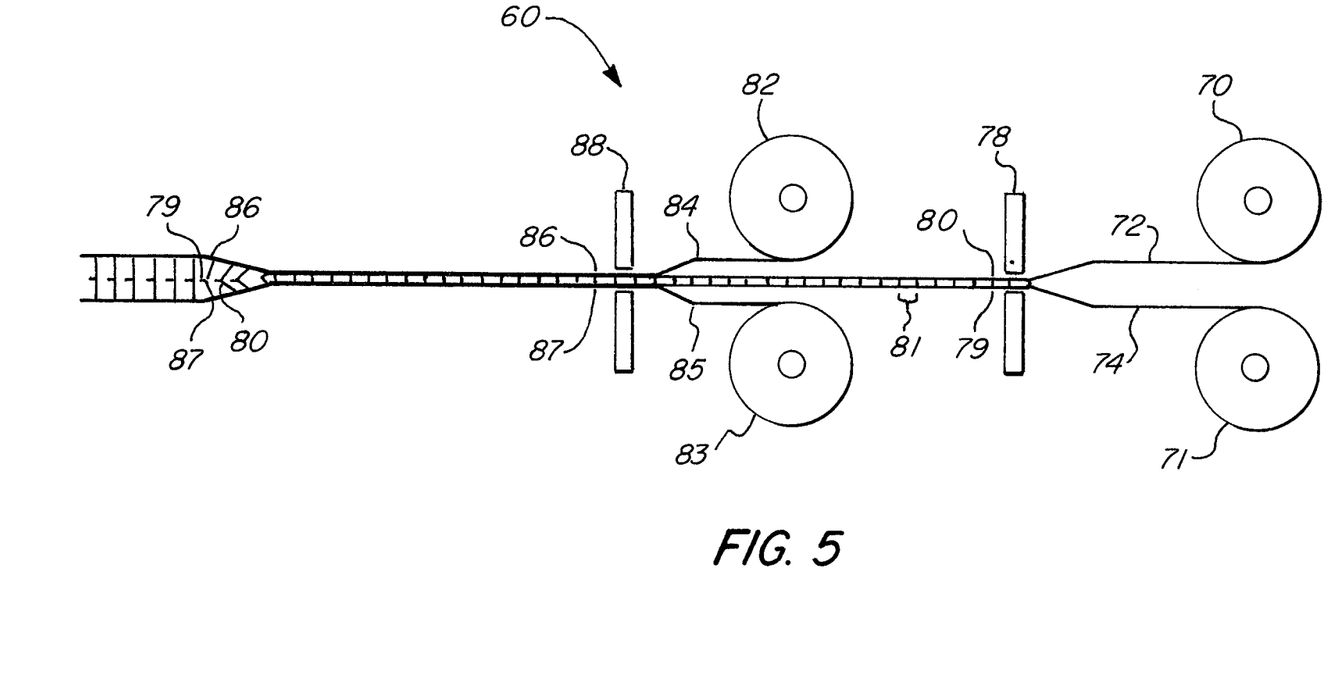
FIG. 5 shows a two dimensional side view of a dual layer film baffle system manufacturing process schematic featuring the multiple layers of heat sealable material and multiple heat seals shown in FIG. 1.
Figure 6:
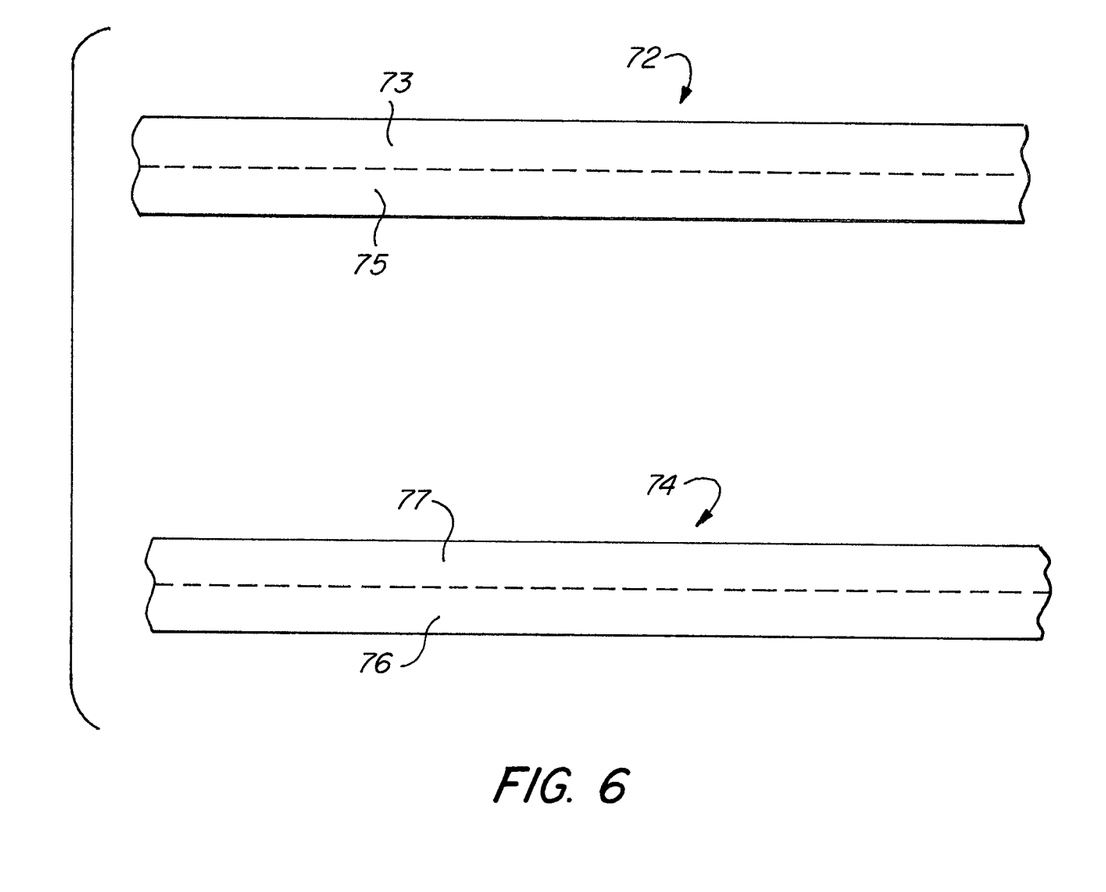
FIG. 6 shows a greatly enlarged schematic two dimensional view of the baffle sheets from the dual layer film baffle system schematic of FIG. 5 as laminates.

The exemplary embodiment of a dual layer film baffle system manufacturing process 60 is shown in FIG. 5. Roll 70 dispenses heat sealable sheet 72 in parallel with heat sealable sheet 74 which is dispensed by roll 71. In the exemplary embodiment, heat sealable sheet 72 and heat sealable sheet 74, FIG. 6, are laminates. Layers 73 and 76 are made of a low temperature heat sealable material, LDPE, and are sealable between a temperature of 225-275 degrees F. Layers 77 and 75 are made of a high temperature sealable material, HDPE, and are sealable between a temperature of 325-375 degrees F.

Figure 7:
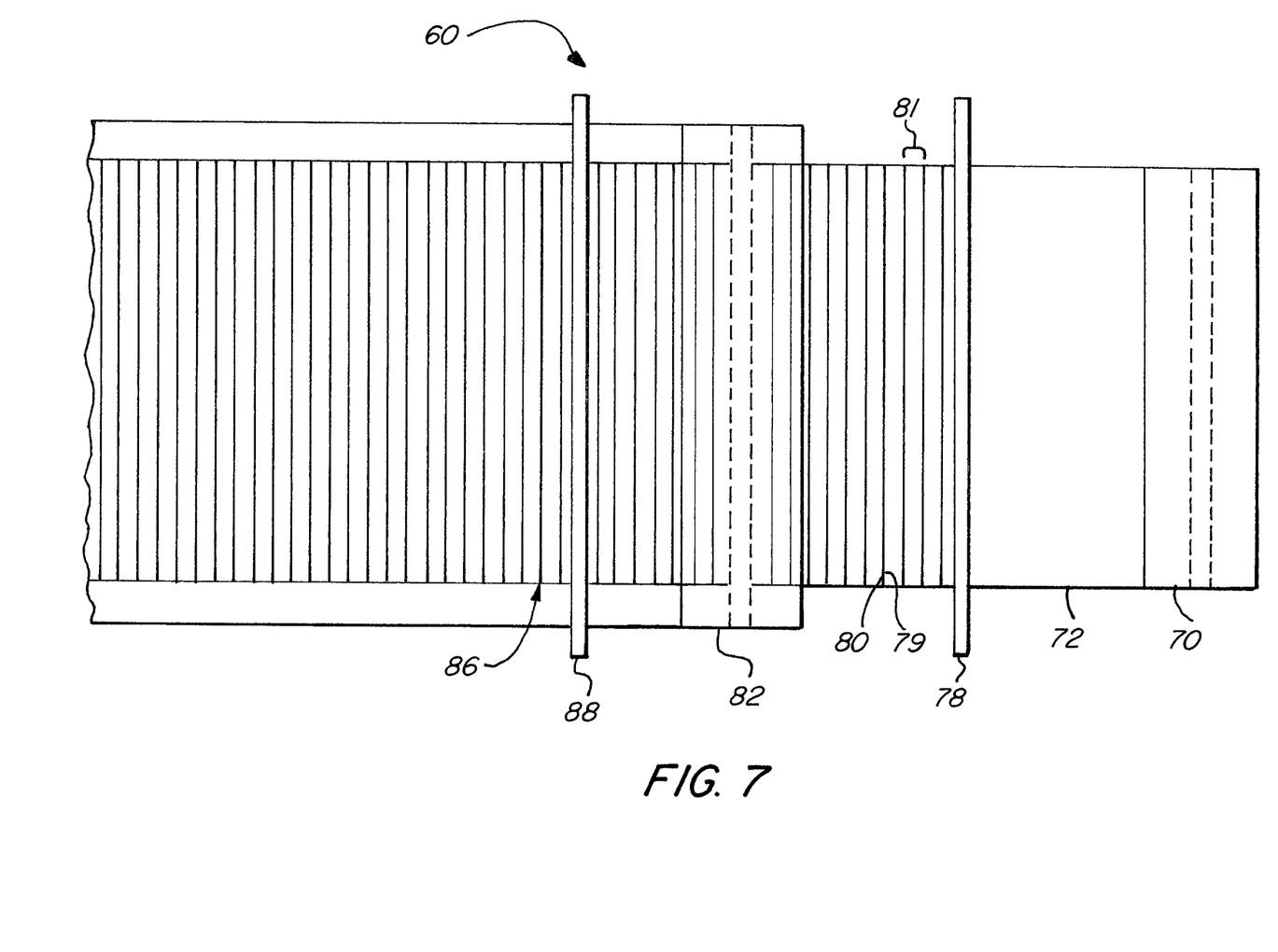
FIG. 7 shows a two dimensional overhead view of the dual layer film baffle system manufacturing process schematic of FIG. 5.
Figure 8:
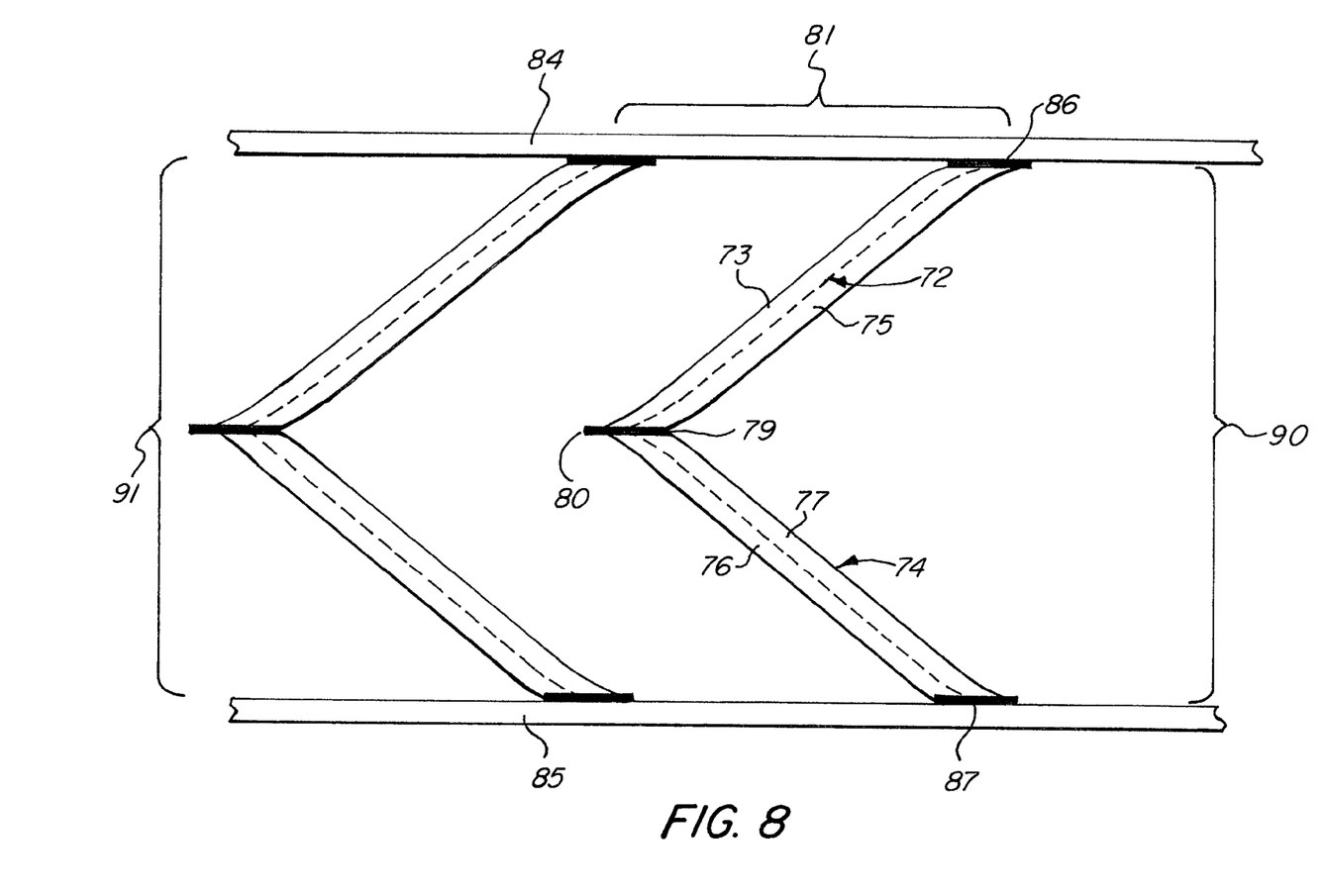
FIG. 8 shows a greatly enlarged schematic two dimensional view of the dual layer film baffle system schematic of FIG. 5 as the exterior sheets are being spread apart.

Sheet 72 and sheet 74, FIG. 5, are brought together at high temperature and perforation station 78. At this point, sheet 72 and sheet 74 are heated to create heat seal 79, FIG. 7, latitudinally across the sheets at some interval 81 dependent upon the desired length of baffles 90 and 91, FIG. 8. Interval 81 may, for example, be one inch. Also at station 78, FIG. 5, the now sealed sheets are perforated at interval 81 and immediately preceding heat seal 79 to create perforated line 80 across the sheets.

Roll 82, FIG. 5, dispenses low temperature sheet 84 onto sheet 72 while roll 83 dispenses low temperature sheet 85 onto sheet 74. Sheets 84 and 85 may be made of LDPE and are heat sealable at a temperature of 225-275 degrees F. The sheets are brought together at low temperature sealing station 88 where low temperature seal 86 is effected between sheet 84 and 72 and low temperature seal 87 is effected between sheets 85 and 74. These low temperature seals also cross the sheets latitudinally and are spaced at interval 81.

Figure 9:
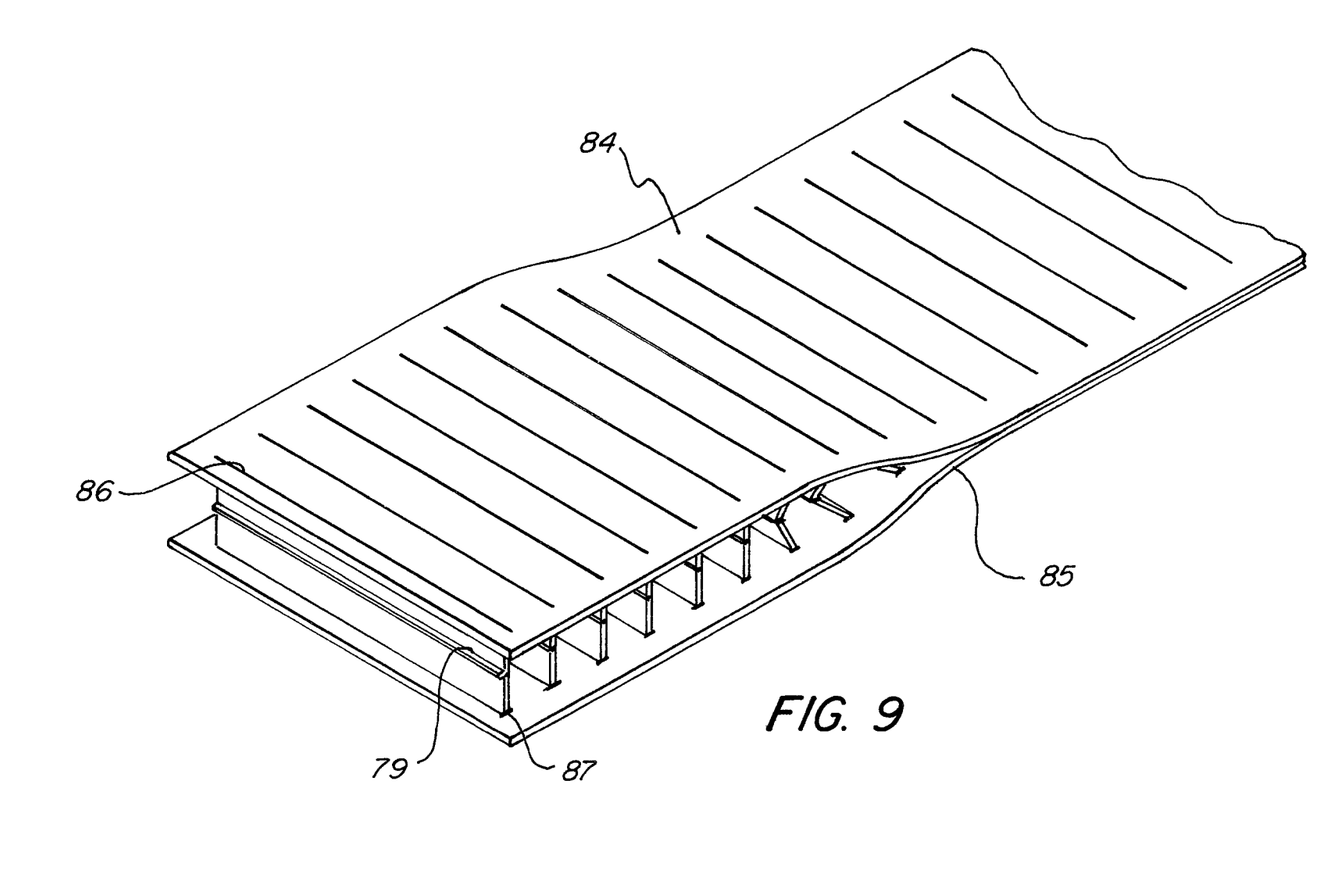
FIG. 9 shows an enlarged perspective view of a finished dual layer film baffle system produced by the manufacturing process of FIG. 5.

Sheets 84 and 85, FIG. 9, are then spread apart. This causes baffle 90, FIG. 8, to separate from baffle 91 at perforated line 80. The end result is a plurality of two piece baffles between sheets 84 and 85. The two pieces of the baffle are joined to each other at high temperature seal 79 and joined to sheet 84 and 85 at low temperature seals 86 and 87.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A method for forming an article, the method comprising the steps of:
   providing at least three layers of heat sealable material;
   heating, in a first heating step, at least one of said at least three layers and at least one opposing layer of said at least three layers with a heating element having a first temperature in a first area to create at least one first heat seal; and
   heating, in a second heating step discrete in time from the first heating step, at least one of said at least three layers and at least one opposing layer of said at least three layers with a heating element having a second temperature in a second area to create at least one second heat seal;
   wherein the second temperature is high enough to cause sealing between said at least two layers joined by said at least one second heat seal but is lower than a temperature required to cause sealing between said at least two layers joined by said at least one first heat seal and wherein the first temperature is higher than said second temperature and is high enough to cause sealing between said at least two layers joined by said at least one first heat seal and between said at least two layers joined by said at least one second heat seal, thereby allowing for targeted heat sealing of different layers in discrete areas of the article in discrete steps.

2. The method for forming an article according to claim 1 wherein the at least three layers of heat sealable material comprise at least one laminate sheet, said sheet comprising a first face sealable at the first temperature and a second face sealable at the second temperature.

3. The method for forming an article according to claim 2, wherein the first face comprises low density polyethylene (LDPE) and the second face comprises high density polyethylene (HDPE).

4. The method for forming an article according to claim 2, wherein the first face comprises a material that is heat sealable between 225-275 degrees F. and the second face comprises a material that is heat sealable between 325-375 degrees F.

5. The method for forming an article according to claim 1 wherein the article comprises a flexible ported pouch and wherein the at least three layers of heat sealable material comprises first and second port sheets of heat sealable material and first and second pouch sheets of heat sealable material.

6. The method for forming an article according to claim 1 wherein the article comprises a dual layer baffle system and wherein the at least three layers of heat sealable material comprises four sheets of heat sealable material.

7. A method of manufacturing a flexible ported pouch comprising the steps of:
   providing a first and second port sheet of heat sealable material in parallel;
   heating, in a first heating step, said first port sheet and said second port sheet along the longitudinal edges of said first and second port sheets with a heating element having a first temperature to create a first and second heat seal forming a port with an exterior and an interior;
   providing a first and second pouch sheet of heat sealable material in parallel;
   introducing said port by interposition between said first and second pouch sheets; and
   heating, in a second heating step discrete in time from the first heating step, a periphery of said first pouch sheet, said second pouch sheet and said exterior of said port where said exterior of said port intersects with said periphery of said first and second pouch sheets with a heating element having a second temperature to create a third heat seal; and
   wherein the second temperature is high enough to cause sealing between said pouch sheets with respect to one another and between said pouch sheets with respect to said port sheets but is lower than a temperature required to cause sealing between said port sheets with respect to one another and wherein the first temperature is higher than said second temperature and is high enough to cause sealing between said pouch sheets with respect to one another, between said pouch sheets with respect to said port sheets and between said port sheets with respect to one another.

8. The method of manufacturing a flexible ported pouch according to claim 7 wherein the first and second port sheets comprise a single port sheet of heat sealable material folded about an axis to create a folded longitudinal port edge and an open longitudinal port edge.

9. The method of manufacturing a flexible ported pouch according to claim 8 wherein the first and second pouch sheets comprise a single pouch sheet of heat sealable material folded about an axis to create a folded pouch edge, and at least two open pouch edges.

10. The method of manufacturing a flexible ported pouch according to claim 7 wherein each of said first and second port sheets of heat sealable material comprises a laminate having an exterior layer sealable at the second temperature and an interior layer sealable at the first temperature.

11. The method of manufacturing a flexible ported pouch according to claim 10, wherein the exterior layer comprises low density polyethylene (LDPE) and the interior layer comprises high density polyethylene (HDPE).

12. The method of manufacturing a flexible ported pouch according to claim 10, wherein the exterior layer comprises a material that is heat sealable between 225-275 degrees F. and the interior layer comprises a material that is heat sealable between 325-375 degrees F.

13. The method of manufacturing a flexible ported pouch according to claim 7 wherein each of said first and second pouch sheets of heat sealable material comprises low density polyethylene (LDPE).

14. The method of manufacturing a flexible ported pouch according to claim 7 wherein said first pouch sheet and said second pouch sheet are sealable to each other and to said first and second port sheets with a heating element having a temperature between 225-275 degrees F.

15. A method of manufacturing a dual layer baffle system comprising the steps of:
    providing a first and second sheet of heat sealable material in parallel;
    heating, in a first heating step, said first sheet and said second sheet with a heating element having a first temperature latitudinally across said first and second sheets at a longitudinal interval to create a plurality of first heat seals;
    perforating said first sheet and said second sheet latitudinally across said first and second sheets at said longitudinal interval creating a plurality of perforated lines;
    introducing a third sheet of heat sealable material to the exterior of said first sheet;
    introducing a fourth sheet of heat sealable material to the exterior of said second sheet;
    heating, in a second heating step discrete in time from the first heating step, said third sheet, said first sheet, said fourth sheet and said second sheet with a heating element having a second temperature latitudinally across said first, second, third and fourth sheets at said longitudinal interval, creating a plurality of second heat seals between said fourth sheet and said second sheet and a plurality of third heat seals between said third sheet and said first sheet; and
    spreading said fourth sheet away from said third sheet thereby separating said first and second sheet along said perforated lines to create baffles between said fourth sheet and said third sheet;
    wherein the second temperature is high enough to cause sealing between said fourth sheet with respect to said second sheet and between said third sheet with respect to said first sheet but is lower than a temperature required to cause sealing between said first sheet with respect to said second sheet and wherein the first temperature is higher than said second temperature and is high enough to cause sealing between said fourth sheet with respect to said second sheet, between said third sheet with respect to said first sheet and between said first sheet with respect to said second sheet.

16. The method of manufacturing a dual layer baffle system according to claim 15 wherein each of said third and fourth sheets of heat sealable material comprises a laminate having an exterior layer sealable at the second temperature and an interior layer sealable at the first temperature.

17. The method of manufacturing a dual layer baffle system according to claim 16, wherein the exterior layer comprises low density polyethylene (LDPE) and the interior layer comprises high density polyethylene (HDPE).

18. The method of manufacturing a dual layer baffle system according to claim 16, wherein the exterior layer comprises a material that is heat sealable between 225-275 degrees F. and the interior layer comprises a material that is heat sealable between 325-375 degrees F.

19. The method of manufacturing a dual layer baffle system according to claim 15 wherein each of said first and second sheets of heat sealable material comprises low density polyethylene (LDPE).

20. The method of manufacturing a dual layer baffle system according to claim 15 wherein said first and said second sheets are sealable to each other and to said third and fourth sheets with a heating element having a temperature between 225-275 degrees F.

* * * * *